United States Patent
Lamusga et al.

(10) Patent No.: US 9,458,726 B2
(45) Date of Patent: Oct. 4, 2016

(54) DOVETAIL RETENTION SYSTEM FOR BLADE TRACKS

(71) Applicants: Rolls-Royce Corporation, Indianapolis, IN (US); Rolls-Royce North American Technologies, Inc., Indianapolis, IN (US)

(72) Inventors: Joseph P. Lamusga, Indianapolis, IN (US); Ted J. Freeman, Danville, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 569 days.

(21) Appl. No.: 14/094,316

(22) Filed: Dec. 2, 2013

(65) Prior Publication Data
US 2015/0044049 A1    Feb. 12, 2015

Related U.S. Application Data

(60) Provisional application No. 61/779,534, filed on Mar. 13, 2013.

(51) Int. Cl.
*F01D 5/22* (2006.01)
*F01D 5/14* (2006.01)
*F01D 11/08* (2006.01)

(52) U.S. Cl.
CPC .............. *F01D 5/225* (2013.01); *F01D 5/147* (2013.01); *F01D 11/08* (2013.01); *F05D 2240/11* (2013.01); *F05D 2260/30* (2013.01); *F05D 2300/6033* (2013.01); *Y02T 50/672* (2013.01); *Y10T 29/4932* (2015.01)

(58) Field of Classification Search
CPC ........ F01D 5/147; F01D 5/225; F01D 11/08; F05D 2240/11; F05D 2260/30; F05D 2300/6033; Y02T 50/672; Y10T 29/4932
See application file for complete search history.

(56) References Cited

U.S. PATENT DOCUMENTS

| | | | | |
|---|---|---|---|---|
| 3,813,185 | A | * | 5/1974 | Bouiller .................... F01D 5/06 415/173.7 |
| 4,087,199 | A | | 5/1978 | Hemsworth et al. |
| 4,460,311 | A | * | 7/1984 | Trappmann ............ F01D 11/12 415/116 |
| 4,512,159 | A | | 4/1985 | Memmen |
| 4,728,257 | A | | 3/1988 | Handschuh |
| 5,074,752 | A | | 12/1991 | Murphy et al. |

(Continued)

FOREIGN PATENT DOCUMENTS

| | | |
|---|---|---|
| EP | 1350927 A2 | 10/2003 |
| EP | 1944474 A2 | 7/2008 |

(Continued)

OTHER PUBLICATIONS

International Search Report and Written Opinion, International Application No. PCT/US2013/072580, Jul. 23, 2014, 12 pages.

*Primary Examiner* — Igor Kershteyn
(74) *Attorney, Agent, or Firm* — Barnes & Thornburg LLP

(57) ABSTRACT

A turbine shroud for a gas turbine engine includes a metallic support ring and a ceramic blade track. The blade track is formed from a plurality of blade track segments including dovetail posts. The dovetail posts are inserted through apertures in the support ring and are coupled to the support ring by segment retainers coupled to the dovetail posts providing a retention system for the ceramic blade track.

20 Claims, 7 Drawing Sheets

(56) References Cited

U.S. PATENT DOCUMENTS

| | | | |
|---|---|---|---|
| 5,080,556 A * | 1/1992 | Carreno | F16J 15/442 |
| | | | 277/590 |
| 6,406,256 B1 | 6/2002 | Marx | |
| 6,648,597 B1 | 11/2003 | Widrig et al. | |
| 6,702,550 B2 | 3/2004 | Darkins et al. | |
| 6,733,235 B2 | 5/2004 | Alford et al. | |
| 6,758,653 B2 | 7/2004 | Morrison | |
| 6,896,483 B2 | 5/2005 | Dirksmeier et al. | |
| 7,052,235 B2 | 5/2006 | Alford et al. | |
| 7,117,983 B2 | 10/2006 | Good et al. | |
| 7,278,820 B2 | 10/2007 | Keller | |
| 7,284,958 B2 | 10/2007 | Dundas et al. | |
| 7,306,826 B2 | 12/2007 | Subramanian et al. | |
| 7,329,101 B2 | 2/2008 | Carper et al. | |
| 7,488,157 B2 | 2/2009 | Marini et al. | |
| 7,510,379 B2 | 3/2009 | Marusko et al. | |
| 7,579,094 B2 | 8/2009 | Subramanian et al. | |
| 7,686,577 B2 | 3/2010 | Morrison et al. | |
| 7,726,936 B2 | 6/2010 | Keller et al. | |
| 7,748,945 B2 * | 7/2010 | Johnson | F01D 11/001 |
| | | | 415/1 |
| 7,754,126 B2 | 7/2010 | Subramanian et al. | |
| 8,128,350 B2 | 3/2012 | Schiavo et al. | |
| 8,246,299 B2 | 8/2012 | Razzell et al. | |
| 8,303,245 B2 | 11/2012 | Foster et al. | |
| 2003/0185674 A1 | 10/2003 | Alford et al. | |
| 2008/0159850 A1 | 7/2008 | Tholen et al. | |
| 2009/0169368 A1 | 7/2009 | Schlichting et al. | |
| 2009/0257875 A1 | 10/2009 | McCaffrey et al. | |
| 2010/0172760 A1 | 7/2010 | Ammann | |
| 2011/0171018 A1 | 7/2011 | Garcia-Crespo | |
| 2011/0318171 A1 | 12/2011 | Albers et al. | |
| 2012/0082540 A1 | 4/2012 | Dziech et al. | |
| 2012/0156029 A1 | 6/2012 | Karafillis et al. | |
| 2014/0271145 A1 * | 9/2014 | Thomas | F01D 11/08 |
| | | | 415/173.1 |

FOREIGN PATENT DOCUMENTS

| | | |
|---|---|---|
| EP | 2034132 A2 | 3/2009 |
| GB | 1487064 A | 9/1977 |
| GB | 2484188 A | 4/2012 |
| JP | 3026346 U | 3/1991 |
| JP | H10205305 A | 8/1998 |

* cited by examiner

DOVETAIL RETENTION SYSTEM FOR BLADE TRACKS

CROSS REFERENCE TO RELATED APPLICATIONS

This application claims priority to and the benefit of U.S. Provisional Patent Application No. 61/779,534, filed 13 Mar. 2013, the disclosure of which is now incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. For example, coupling such components with traditional fasteners such as rivets or bolts may not allow for the differing levels of expansion and contraction during operation of the gas turbine engine.

SUMMARY

The present application discloses one or more of the features recited in the appended claims and/or the following features which, alone or in any combination, may comprise patentable subject matter.

A turbine shroud for use in the turbine section of a gas turbine engine is disclosed in this paper. The turbine shroud is adapted to extend around a rotatable turbine wheel assembly having a wheel and blades. The turbine shroud blocks hot gasses flowing through the turbine section from passing over the blades without pushing the blades. By ensuring that the hot gasses push the blades, the turbine shroud helps cause the turbine wheel assembly to rotate when hot gasses are driven through the turbine section from a combustion section of the gas turbine engine. Rotation of the turbine wheel assembly can then be used to drive a compressor, a fan, a propeller, a generator, or other modules coupled to the turbine wheel assembly.

In illustrative embodiments, the turbine shroud disclosed includes a metallic support ring and a ceramic blade track. The metallic support ring is adapted to be coupled to other metallic components of the turbine section to hold the turbine shroud in place relative to the rest of the turbine section. The ceramic blade track is illustratively made up of a plurality of ceramic blade track segments manufactured from a ceramic matrix composite material adapted to withstand high temperatures. The plurality of ceramic blade track segments are arranged to form a hoop around the turbine wheel assembly so that the ceramic blade track is positioned radially between the metallic support ring and the turbine wheel assembly. The position of the ceramic blade track insulates the metallic support ring from the hot gasses directed at the blades of the turbine wheel assembly.

In illustrative embodiments, the turbine shroud also includes a plurality of segment retainers adapted to hold each of the plurality of ceramic blade track segments in place relative to the metallic support ring while allowing the metallic support ring and the ceramic segments of the blade track to expand and contract at different rates based on temperature. The metallic support ring has a metallic inner carrier formed to include a plurality of apertures. The plurality of ceramic blade track segments each includes an arcuate runner arranged radially inward from the metallic inner carrier and at least one dovetail post extending radially outward from the arcuate runner through one of the apertures formed in the metallic inner carrier. The plurality of segment retainers mate with the dovetail posts of each ceramic blade track segment so that the plurality of ceramic blade track segments are coupled to the metallic inner carrier.

These and other features of the present disclosure will become more apparent from the following description of the illustrative embodiments.

DETAILED DESCRIPTION OF THE DRAWINGS

Figure 1:
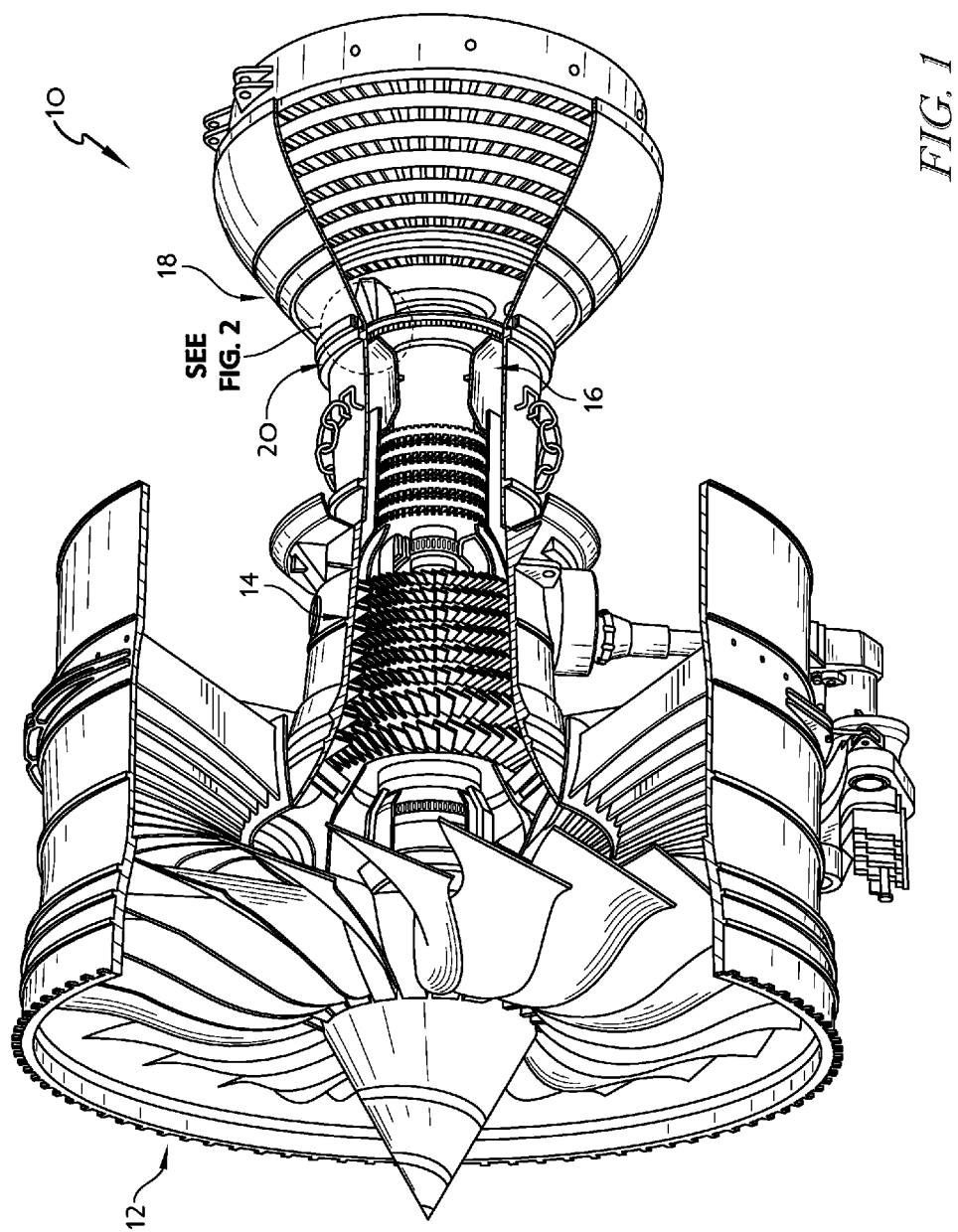
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 10 cut-away to show that the engine 10 includes a fan 12, a compressor 14, a combustor 16, and a turbine 18 all mounted to a case 20. The fan 12 is driven by the turbine 18 and provides thrust for propelling an air vehicle (not shown). The compressor 14 is configured compress and deliver air to the combustor 16. The combustor 16 is configured to mix fuel with the compressed air received from the compressor 14 and to ignite the fuel. The hot high pressure products of the combustion reaction in the combustor 16 are directed into the turbine 18 and the turbine 18 extracts work to drive the compressor 14 and the fan 12.

Figure 2:
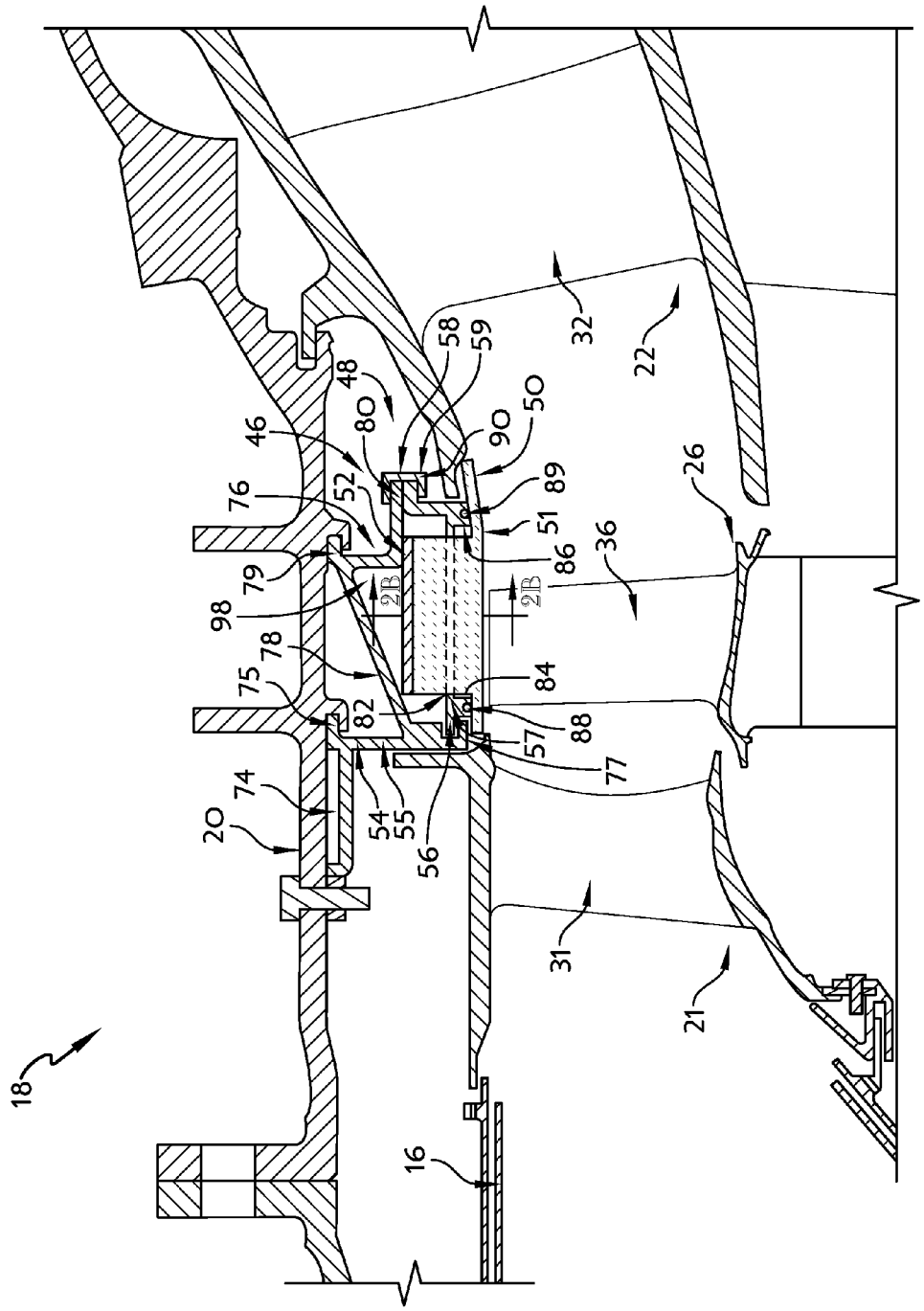
FIG. 2 is a partial cross-sectional view of the gas turbine engine of FIG. 1 showing the arrangement of a turbine shroud in the gas turbine engine.

Referring now to FIG. 2, a portion of the turbine 18 is shown to include static turbine vane assemblies 21, 22 and a turbine wheel assembly 26. Each vane assembly 21, 22 includes a plurality corresponding of vanes 31, 32 and the turbine wheel assembly 26 includes a plurality of corresponding blades 36. The vanes 31 of the vane assembly 21 extend across the flow path of the hot, high-pressure combustion products from the combustor 16 to direct the combustion products toward the blades 36 of the turbine wheel assembly 26. The blades 36 are in turn pushed by the combustion products to cause the turbine wheel assembly 26 to rotate; thereby, driving the rotating components of the compressor 14 and the fan 12.

The turbine 18 also includes a turbine shroud 46 that extends around turbine wheel assembly 26 to block combustion products from passing over the blades 36 without pushing the blades 36 to rotate as shown in FIG. 2. Combustion products that are allowed to pass over the blades 36 do not push the blades 36 and such passed-over products contribute to lost performance within the engine 10.

Figure 2A:
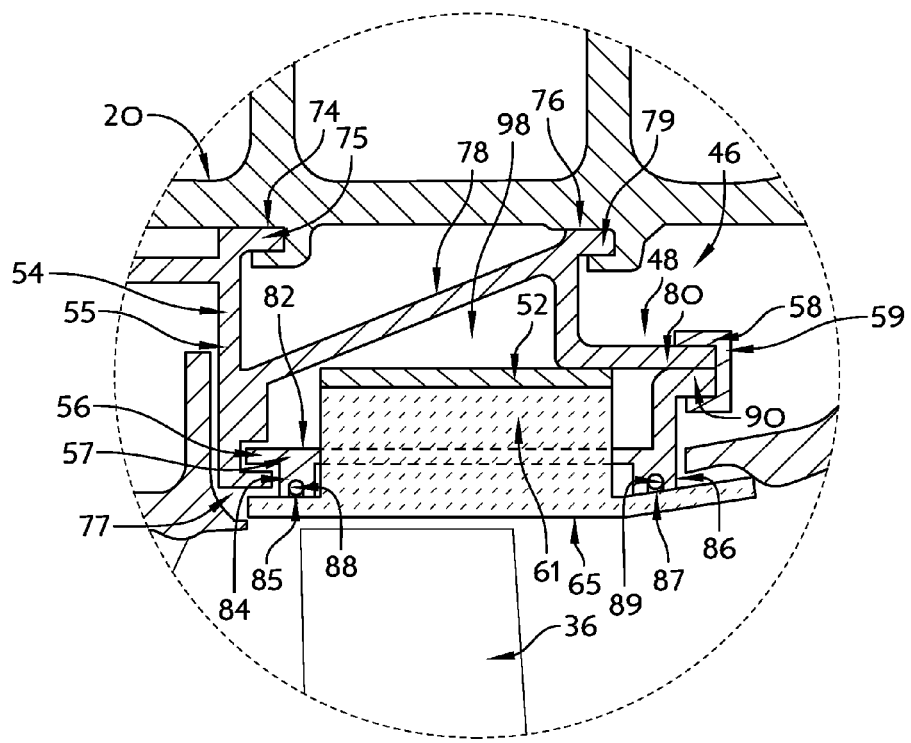
FIG. 2A is a detail cross-sectional view showing a portion of FIG. 2.
Figure 2B:
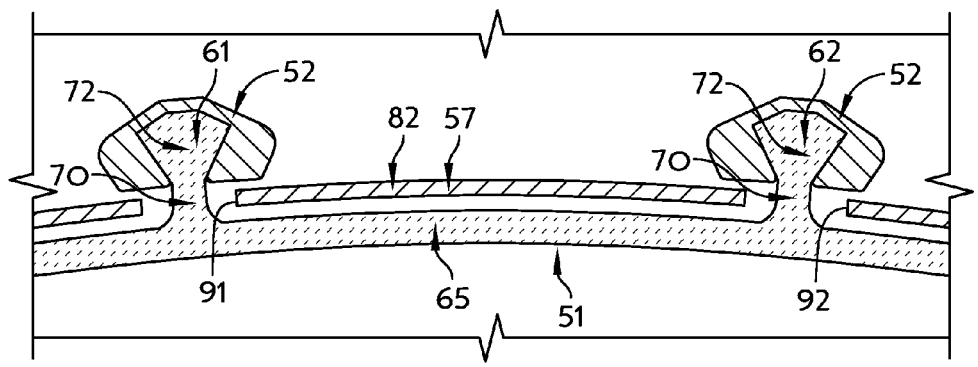
FIG. 2B is another detail cross-sectional view taken along line 2B-2B shown in FIG. 2.

The turbine shroud 46 illustratively includes a metallic support ring 48, a ceramic blade track (sometimes called seal ring) 50, and a plurality of metallic segment retainers 52 as shown in FIGS. 2, 2A, and 2B. The support ring 48 is coupled to the case 20 and extends inwardly in a radial direction from the case 20 toward the turbine wheel assembly 26. The blade track 50 is coupled to the support ring 48 by the segment retainers 52 and is supported by the support ring 48 in position adjacent to the blades 36 of the turbine wheel assembly 26 so that the blades 36 run along the blade track 50.

The support ring 48 is an annular component including an outer carrier 54 and an inner carrier 56 as shown in FIGS. 2 and 2A. The outer carrier 48 is coupled to the inner carrier 50 by a clip 58 that is deformed to clamp down on both the outer carrier 48 and the inner carrier 50. The outer carrier 54 is made up of a plurality of outer carrier segments 55 and is coupled to the case 20. The inner carrier 56 is made up of a plurality of inner carrier segments 57 each coupled to a corresponding outer carrier segment 55. The clip 58 is also made up of a plurality clip segments 59 with a C-shaped cross-section that forms a forward facing channel 71. In other embodiments, the outer carrier 54, the inner carrier 56, and the clip 58 may each be monolithic components rather than segmented components.

Figure 3:
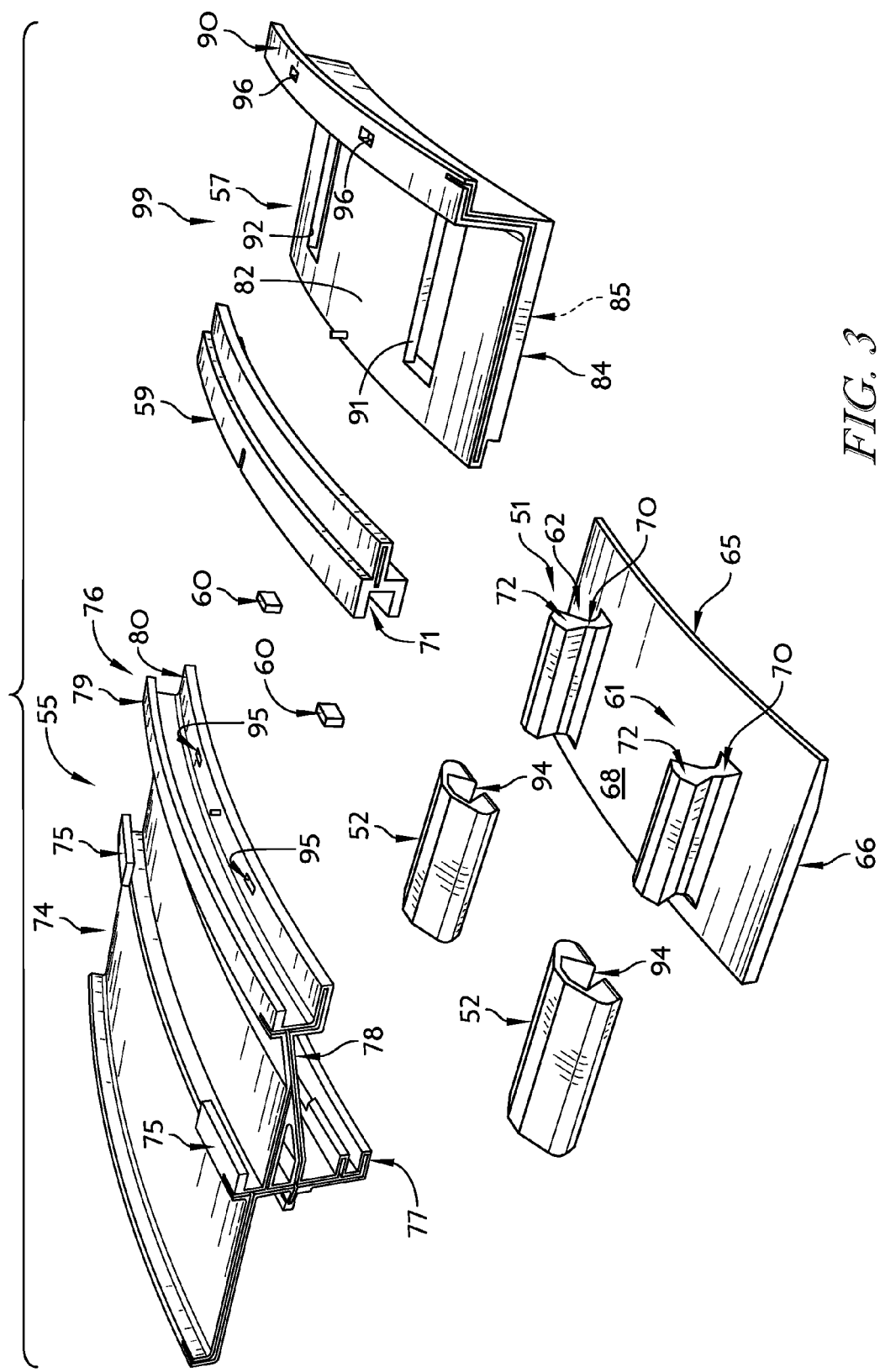
FIG. 3 is an exploded perspective view of a segment of the turbine shroud shown in FIG. 2 showing that the turbine shroud includes a blade track segment with axially-extending dovetail posts, an inner carrier segment, a plurality of segment retainers, a clip segment, and an outer carrier segment.

The blade track 50 is made up of a plurality of blade track segments 51, one of which is shown in FIG. 3. Each of the blade track segments 51 is coupled to a corresponding outer carrier segment 55 and an inner carrier segment 57 by two of the segment retainers 52 to support the blade track segment 51 in position adjacent to the blades 36 of the turbine wheel assembly 26 as shown in FIG. 2.

In the illustrative embodiment, the blade track segments 51 are each made from a ceramic material; and, more particularly, a ceramic matrix composite (CMC). However, other ceramic materials are contemplated. For purposes of this application, a ceramic material is any monolithic ceramic or composite in which at least one constituent is a ceramic. In other embodiments, the blade track segments 51 may be made of other metallic, non-metallic, or composite materials.

Turning now to FIG. 3, segments 51, 55, 57, 59 of the blade track 50, the outer carrier 54, the inner carrier 56, and the clip 58 are shown along with two segment retainers 52 and two locating keys 60. Each of the segments 51, 55, 57, 59 are repeated to provide the fully annular turbine shroud 46.

Each blade track segment 51 includes an arcuate runner 65, a first dovetail post 61, and a second dovetail post 62 as shown in FIG. 3. The arcuate runner 65 is located adjacent to the blades 36 of the turbine wheel assembly 26 so that the blades 36 move along an inner radial face 66 of the arcuate runner 65. The dovetail posts 61, 62 are coupled to an outer radial face 68 of the arcuate runner 65 and are spaced radially from one another as shown in FIG. 3.

Each of the dovetail posts 61, 62 includes a body 70 and a head 72 as shown in FIG. 3. The body 70 of each dovetail post 61, 62 extends outward in the radial direction from the arcuate runner 65 and axially along the arcuate runner 65. The head 72 of each dovetail post extends circumferentially in both directions from the body 70 so that the head 72 can be captured by the segment retainers 52 when the turbine shroud 46 is assembled as shown in FIG. 2B.

Each of the outer carrier segments 55 includes a forward connection portion 74, an aft connection portion 76, and an intermediate portion 78 extending axially from the forward connection portion 74 to the aft connection portion 76 as shown in FIG. 3. The forward connection portion 74 includes outer hangers 75 for connecting the outer carrier 54 to the case 20 and inner hangers 77 for connecting the outer carrier 54 to a forward portion of the blade track 50. The aft connection portion 76 includes an outer hanger 79 for connecting the outer carrier 54 to the case 20 and an aft flange 80 for connecting the outer carrier 54 to the inner carrier 56 via the clip 58 as shown in FIG. 2A.

Each of the inner carrier segments 57 includes an arcuate plate 82, a forward seal carrier 84, an aft seal carrier 86, and an aft flange 90 as shown in FIGS. 2 and 3. The arcuate plate 82 is formed to include apertures 91, 92 sized and arranged to receive the dovetail posts 61, 62 of the corresponding blade track segment 51 as shown in FIGS. 2A and 2B. The forward seal carrier 84 is spaced forward in the axial direction from the apertures 91, 92 and extends inward in the radial direction from the plate 82. The aft seal carrier 86 is spaced aft in the axial direction from the apertures 91, 92 and extends inward in the radial direction from the plate 82. Each seal carrier 84, 86 forms a corresponding seal receiving channel 85, 87 extending circumferentially along the plate 82 and sized to receive rope seals 88, 89 as shown in FIG. 2A. The aft flange 90 is coupled to the aft flange 80 of the outer carrier segment 55 via the clip 58 as shown in FIG. 2A.

When assembled, the outer carrier 54 and the inner carrier 56 cooperate to form an annular cavity 98 as shown in FIG. 2A. The heads 72 and the segment retainers 52 are arranged in the annular cavity 98 when the turbine shroud 46 is assembled.

Each segment retainer 52 is illustratively C-shaped forming a retention channel 94 sized and arranged to receive the head 72 of one of the dovetail posts 62, 64 as shown in FIGS.

2A and 3. Further, each segment retainer 52 is sized to block the heads 72 of the dovetail posts 61, 62 from moving through the apertures 91, 92 of the inner retainer 56 when the segment retainers 52 are coupled to the dovetail posts 61, 62 as shown in FIG. 2B. In other embodiments, the segment retainers 52 may be coupled to or incorporated into the inner carrier segments 57 and the apertures 91, 92 of the inner carrier segments 57 may be slots extending from an edge of the inner carrier segment 57.

In other embodiments, the arrangement of the dovetail retention system formed by the blade track segments 51, the segment retainers 52, and the inner carrier segments 57 may be reversed. In such an embodiment, the segment retainers 52 may be incorporated into the blade track segments 51 in place of the dovetail posts 61, 62. Further, the dovetail posts 61, 62 may be attached to plates and may extend through the apertures formed in the inner carrier segments 57 to allow mating of the dovetail posts 61, 62 with the segment retainers 52.

The locating keys 60 are configured to locate circumferentially the inner carrier segments 57 relative to the outer carrier segments 55 when the turbine shroud 46 is assembled. The aft flange 80 of the outer carrier segment 55 is formed to include holes 95 sized to receive the locating keys 60 as shown in FIG. 3. The aft flange 90 of the inner carrier segment 57 is formed to include notches 96 sized to receive a portion of the locating keys 60. When assembled, the locating keys 60 extend through the holes 95 and into the notches 96 to locate the inner carrier segments 57 relative to the outer carrier segments 55.

According to one method of assembling the turbine shroud 46, the blade track segment 51 is first coupled to the inner carrier segment 57 by the segment retainers 52. To couple the blade track segment 51 to the inner carrier segment 57, the dovetail posts 61, 62 of a blade track segment 51 are radially inserted through the apertures 91, 92 formed in the inner carrier segment 57 as shown in FIGS. 2, 2A, and 2B. Then segment retainers 52 are slid over the heads 72 of the dovetail posts 61, 62 so that the heads of the dovetail posts 61, 62 are received in the retention channels 94 of a segment retainer 52.

Next, the outer carrier segment 55 is located circumferentially relative to the inner carrier segment 57. To locate the outer carrier segment 55, the outer carrier segment 55 is placed over the inner carrier segment 57 with holes 95 formed in the aft flange 80 of the outer carrier segment 55 aligned with notches 96 formed in the aft flange 90 of the inner carrier segment 57. Then, locating keys 60 are inserted through holes 95 are into notches 96.

Then the outer carrier segment 55 is coupled to the inner carrier segment 57. To couple the outer carrier segment 55 to the inner carrier segment 57, the clip segment 59 is slid over the aft flanges 80, 90 included in the outer carrier segment 55 and the inner carrier segment 57, respectively, so that the aft flanges 80, 90 are received in the channel 71 formed by the clip segment 59. The clip segment 59 is then deformed or crimped to engage the aft flanges 80, 90 coupling the outer carrier segment 55 and the inner carrier segment 57.

After assembling a set 99 of corresponding segments 51, 55, 57, 59, other sets 99 are assembled. The sets 99 are then arranged in a circular pattern and coupled together. The sets 99 are coupled together via strip seals (not shown) to form the annular turbine shroud 46. The turbine shroud 46 is then coupled to the case 20 via outer hangers 75, 78 included in the outer carrier 54 as shown in FIG. 2.

Figure 4:
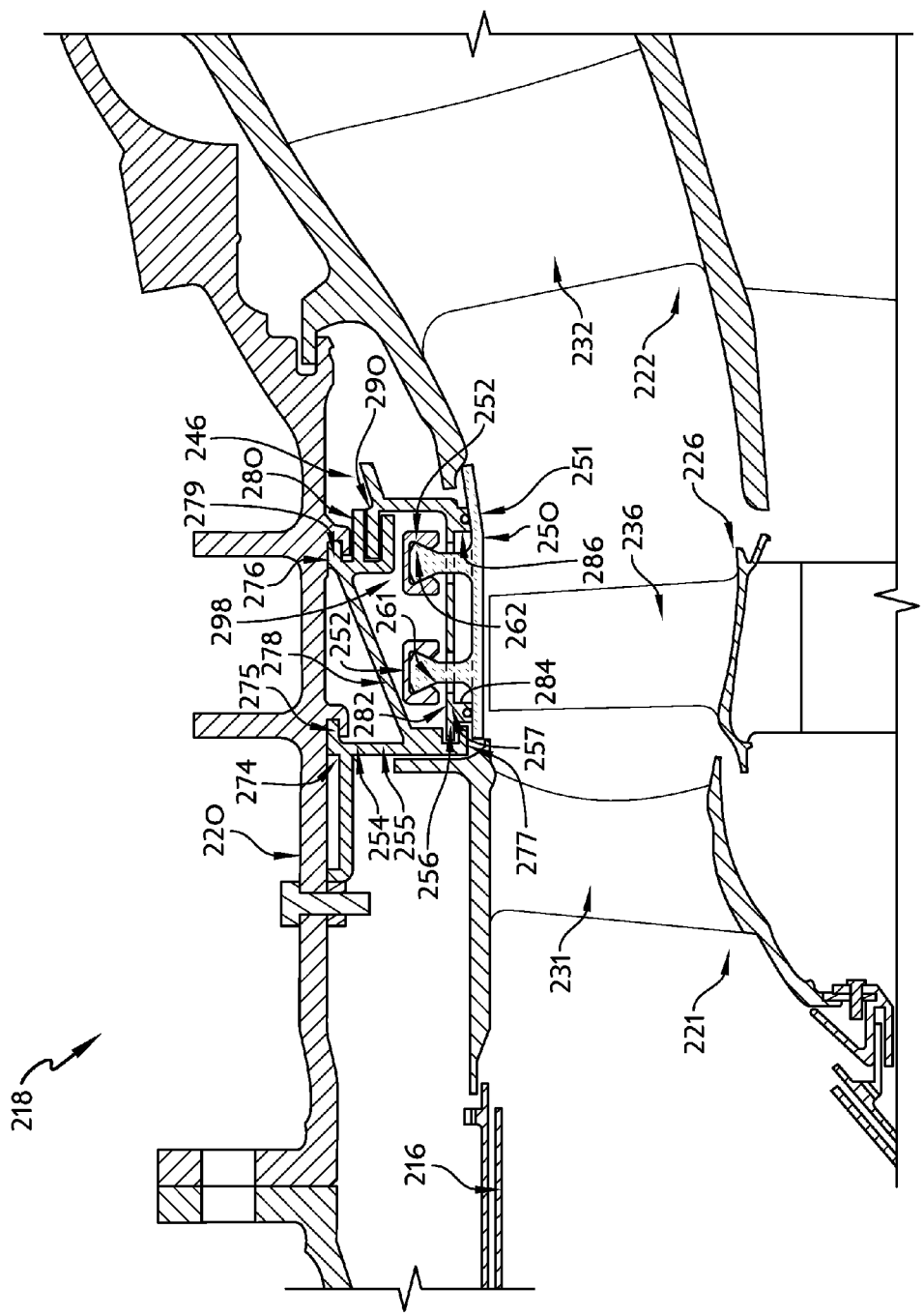
FIG. 4 is a partial cross-sectional view of another gas turbine engine showing the arrangement of another turbine shroud in the gas turbine engine.
Figure 5:
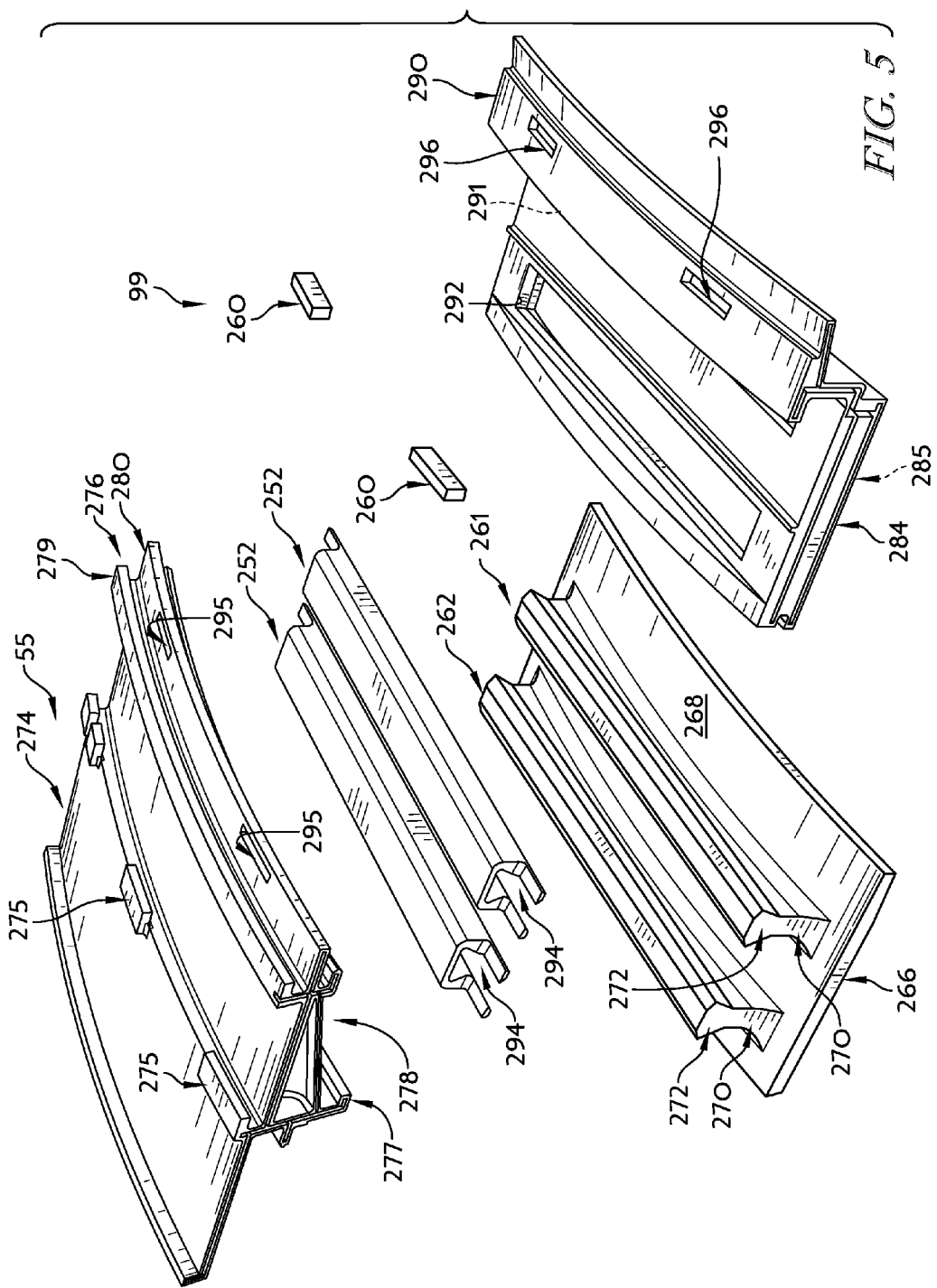
FIG. 5 is an exploded perspective view of a section of the turbine shroud shown in FIG. 4.

Another illustrative turbine shroud 246 is shown in FIGS. 4-5. The turbine shroud 246 is configured for use in engine 10 and is substantially similar to the turbine shroud 46 shown in FIGS. 1-4 and described herein. Accordingly, similar reference numbers in the 200 series indicate features that are common between the turbine shroud 46 and the turbine shroud 246. Further the method of assembling the turbine shroud 246 is similar to the method of assembling the turbine shroud 46 described herein. The description of the engine 10 and the turbine shroud 46 and its method of assembly are hereby incorporated by reference to apply to the turbine shroud 246, except in instances when it conflicts with the specific description and drawings of the turbine shroud 246.

Unlike the turbine shroud 46, the dovetail posts 261, 262 that are coupled to the arcuate runner 265 are spaced axially from one another as shown in FIG. 5. Also, the body 270 of each dovetail post 261, 262 extends circumferentially along the arcuate runner 265. Further, the head 272 of each dovetail post extends axially in both directions from the body 270 as shown in FIG. 3A. In the illustrative embodiment, the heads 272 of each dovetail post 261, 262 is flat, or tangent, to the outer radial surface of the runner 265. In other embodiments, the heads 272 of each dovetail post 261, 262 are arcuate and spaced a consistent distance from the runner 265. To accommodate the dovetail posts 261, 262, the arcuate plate 282 is formed to include apertures 291, 292 that extend circumferentially as shown in FIG. 5 to receive the dovetail posts 261, 262 of the corresponding blade track segment 251 as shown in FIG. 5.

Figure 4A:
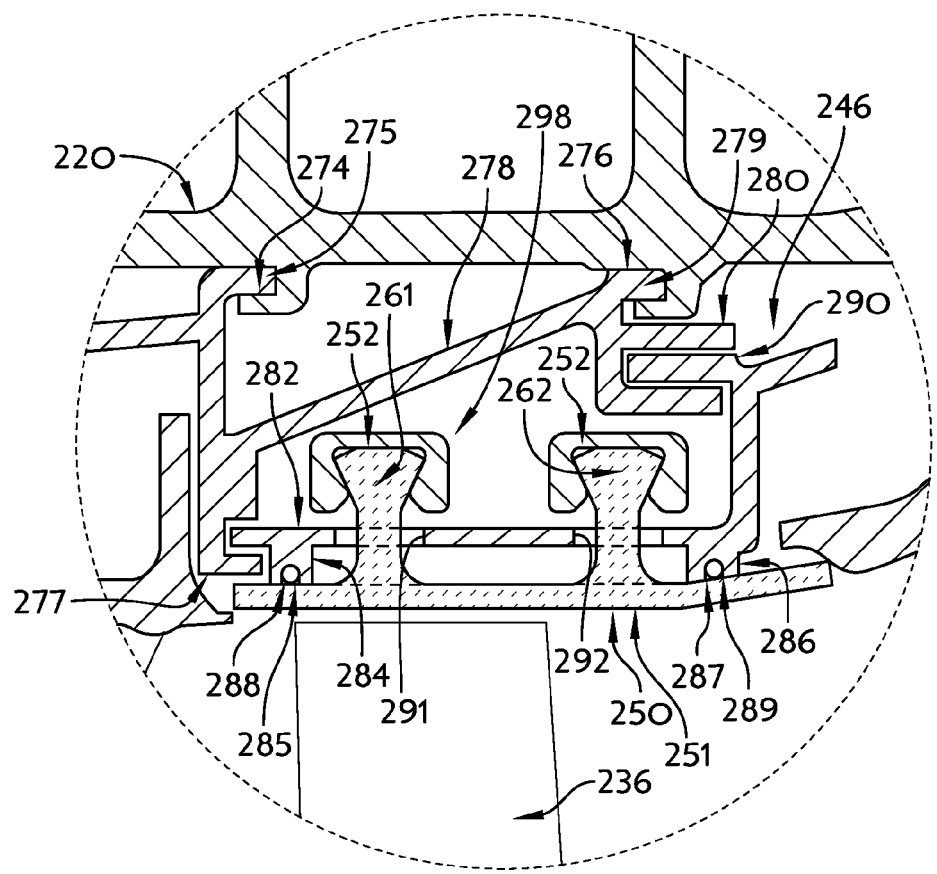
FIG. 4A is a detail cross-sectional view showing a portion of FIG. 4.

Also, unlike the turbine shroud 46, the aft flanges 280, 290 of the outer carrier 254 and the inner carrier 256 are coupled via a bird mouth and hanger arrangement as shown in FIGS. 4 and 4A. More specifically, the aft flange 280 of the outer carrier 254 forms a rearwardly-opening channel that receives the aft flange 290 as shown in FIGS. 4 and 4A.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
a metallic inner carrier formed to include a plurality of apertures,
a plurality of ceramic blade track segments each including an arcuate runner arranged radially inward from the metallic inner carrier and a dovetail post extending radially outward from the arcuate runner through one of the apertures formed in the metallic inner carrier, and
a plurality of segment retainers arranged radially outward from the metallic inner carrier, each segment retainer formed to include a retention channel mated with a portion of a corresponding dovetail post, and each segment retainer sized to block movement of the corresponding dovetail post through the aperture so that the plurality of ceramic blade track segments are coupled to the metallic inner carrier.

2. The turbine shroud of claim 1, wherein each dovetail post includes a body extending radially outward from a corresponding arcuate runner through the aperture formed in the metallic inner carrier and a head spaced apart from the arcuate runner, and the head is received in the retention channel of the segment retainer.

3. The turbine shroud of claim 2, wherein the body extends axially along an outer radial face of the arcuate runner.

4. The turbine shroud of claim 2, wherein the body is arcuate and extends circumferentially along an outer radial face of the arcuate runner.

5. The turbine shroud of claim 2, wherein the head extends circumferentially both clockwise and counter-clockwise from the body.

6. The turbine shroud of claim 2, wherein the head extends axially both forward and aft from the body.

7. The turbine shroud of claim 6, wherein the retention channel formed in the segment retainer is arcuate.

8. The turbine shroud of claim 1, further comprising a first perimeter seal arranged radially between the metallic inner carrier and the arcuate runner of the blade track segment.

9. The turbine shroud of claim 8, wherein the first perimeter seal is a rope seal.

10. The turbine shroud of claim 6, wherein the first perimeter seal is arranged axially forward of the dovetail post.

11. The turbine shroud of claim 10, further comprising a second perimeter seal arranged radially between the metallic inner carrier and the arcuate runner, and the second perimeter seal is arranged axially rearward of the dovetail post.

12. The turbine shroud of claim 2, further comprising an outer carrier coupled to the metallic inner carrier, and the outer carrier cooperates with the metallic inner carrier to form an annular cavity between the outer carrier and the metallic inner carrier.

13. The turbine shroud of claim 12, wherein the head of the dovetail post and the segment retainer are located in the annular cavity.

14. The turbine shroud of claim 1, wherein the ceramic blade track segment includes ceramic fibers and a matrix material.

15. A turbine shroud comprising
an inner carrier formed to include a first aperture,
a blade track segment including an arcuate runner arranged radially inward from the inner carrier and a first dovetail post extending radially outward from the arcuate runner through the first aperture formed in the inner carrier, and
a first segment retainer arranged radially outward from the inner carrier and mated with a portion of the first dovetail post.

16. The turbine shroud of claim 15, wherein the inner carrier has a first coefficient of thermal expansion and the blade track segment has a second coefficient of thermal expansion that is smaller than the first coefficient of thermal expansion.

17. The turbine shroud of claim 15, wherein inner carrier is formed to include a second aperture, the blade track segment includes a second dovetail post extending radially outward from the arcuate runner through the second aperture formed in the inner carrier, and the turbine shroud further comprises a second segment retainer arranged radially outward from the inner carrier and mated with a portion of the second dovetail post.

18. The turbine shroud of claim 17, wherein the first dovetail post and the second dovetail post are spaced circumferentially apart.

19. The turbine shroud of claim 17, wherein the first dovetail post and the second dovetail post are spaced axially apart.

20. A method of assembling a turbine shroud comprising the steps of
inserting a dovetail post included in a ceramic blade track segment through an aperture formed in a metallic inner carrier,
sliding a segment retainer over a portion of the dovetail post inserted through the aperture, and
attaching the metallic inner carrier to a metallic turbine case.

* * * * *